UNITED STATES PATENT OFFICE.

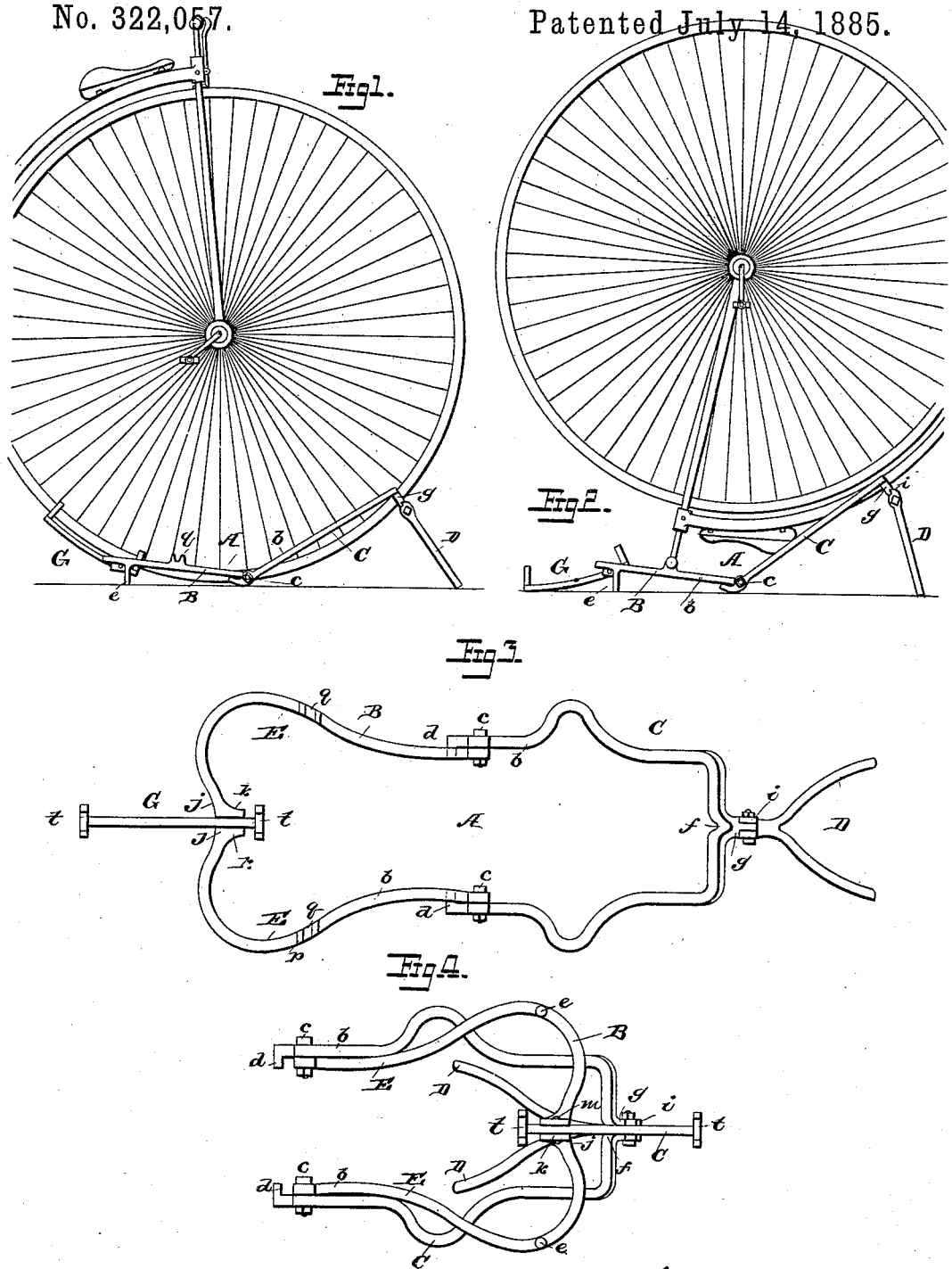

HARRIE B. HART, OF PHILADELPHIA, PENNSYLVANIA.

BICYCLE-STAND.

SPECIFICATION forming part of Letters Patent No. 322,057, dated July 14, 1885.

Application filed June 5, 1885. (No model.)

*To all whom it may concern:*

Be it known that I, HARRIE B. HART, a citizen of the United States, and resident of the city of Philadelphia, in the county of Philadelphia and State of Pennsylvania, have invented certain new and useful Improvements in Bicycle-Stands, of which the following is a specification.

The object of my invention is to provide a cheap, simple, convenient, and compact stand for bicycles; and to that end the invention consists in a stand of the character named which will support or hold a bicycle firmly either in an upright position for ordinary purposes or in an inverted position, so that the machine can be readily cleaned, the bearings adjusted, &c., the bicycle being held in either position without changing that of the stand.

The invention further consists in constructing the stand in such a manner that it may be easily folded into a compact shape for convenience in storage or transportation, all as fully set forth hereinafter.

In the drawings, Figure 1 is a side view of a stand embodying my invention with a portion of a bicycle supported thereon. Fig. 2 is a similar view showing a bicycle in an inverted position. Fig. 3 is an enlarged plan view of the stand with the bicycle removed, and Fig. 4 is an enlarged view of the stand when folded.

A is the body of the stand, consisting, essentially, of two frames, B C, each approximately of a U shape, pivotally joined together at the termination of the side arms, $b$ $b$, by rivets or bolts $c$. The frame B is slightly contracted where it is joined with the frame C, so as to be overlapped by the arms of the latter a short distance, as shown in Fig. 3, while the side arms of the frame C project beyond the pivots and terminate in fingers or stops $d$, at right angles to the arms of which they are extensions, and pass under the frame B, so as to limit the spread of the frames when unfolded. The stand, when open, rests upon the floor or ground at the joints of the frames, while the opposite ends of the latter are slightly elevated, so that the frames incline toward their point of connection. The frame B is supported in this inclined position by legs $e$, preferably formed in one piece with the body thereof, and the frame C is provided with a notch, $f$, in a projection, $g$, on the under side of the frame, to which projection is pivoted the upper end of a forked leg, D, provided with shoulders $i$, which limit the outward movement of the leg upon its pivot. This leg D may be readily swung upon its pivot to a position parallel with the sides of the frame C; but when the parts are disposed as shown in Fig. 1 the support is at right angles to the frame and serves to elevate the outer end of the frame.

The frame B is preferably composed of two sections, E, each approaching an L shape, and terminating at the ends $j$ in ears $k$, between which is pivotally secured a bar or lever, G, by a bolt or rivet, $m$, passing through said ears and the lever, and rigidly connecting the sections together. The ends of the lever G are bent at right angles to the body portion thereof, and have notches $t$ $t$ in line with the depression or notch $f$ in the frame C.

Each section E of the frame B is provided on its upper side with a lip or ear, $p$, having a semicircular notch, $q$, to receive the handle-bar of the bicycle when the latter is placed upon the stand in an inverted position.

The stand, as above described, is preferably made of bar-iron of any suitable shape in cross-section, and the two main frames of the stand may be each made of a single piece of material bent to the desired form; or each frame may be made in sections securely bolted or riveted together to prevent the play of the parts. Instead of making the stand of bar-iron, however, it may, with like facility, be made of cast metal of any desirable kind.

From the description and illustration the use of the stand will be apparent.

The bicycle is rolled onto the bar G so that the rim of the driving-wheel enters the notches of said bar, and as the machine is advanced the bar swings on its pivot until the rim of the wheel reaches the notch $f$ in the extreme end of the stand, when the machine will be securely held in an upright position on the stand slightly above the ground, and will be braced against lateral movement by the forked ends of the bar G, forming the notches and the sides of the notch $f$.

When it is desired to place the bicycle upon the stand in an inverted position for the purpose of cleaning or repairing the machine, this may be conveniently done by turning the head of the latter toward the ground and placing the handle-bar in the notches $q$, when said bar acts as a pivot upon which to further move the machine until the backbone of the latter reaches the notch $f$, in which position the bicycle will be firmly held, rendering all parts convenient of access.

To prevent marring the painted parts of the bicycle where they come in contact with the stand, I pack or cover the latter with rubber or other suitable material wherever the bicycle is to rest thereon.

It will be seen that while my improved stand possesses the desirable qualities of simplicity and firmness, it can at the same time be cheaply made, and may be folded into a compact body for convenient transportation.

I claim—

1. A bicycle-stand consisting of two approximately U-shaped frames hinged together for folding one upon the other, stops upon one of said frames adapted to engage with the other frame to limit the spread of the stand, and a bar pivoted to one of said frames and provided with notched ends, and a notch in the other of said frames in line with the notches in said bar, substantially as and for the purpose set forth.

2. A bicycle-stand consisting of two frames hinged together for folding one upon the other, and provided with notches for supporting a bicycle in either an upright or inverted position when the stand is unfolded, stops for limiting the spread of the stand, a bar pivoted to one of said frames and provided with notched ends, and a support hinged to the other of said frames, and shoulders upon said support to limit its outward movement, substantially as and for the purpose set forth.

3. The combination, in a bicycle-stand, of the frames B C, hinged together, stops for limiting the spread of the frames, bar G, pivoted to the frame B and provided with notched ends, notched ears $p$ and legs $e$ upon the frame B, and a forked leg having shoulders and pivoted to a lip, $g$, upon the under side of the frame C, substantially as and for the purpose set forth.

In testimony whereof I have signed my name to this specification in the presence of two subscribing witnesses.

HARRIE B. HART.

Witnesses:
JAMES S. BROWN,
S. SPENCER CHAPMAN.